(12) United States Patent
Kingery

(10) Patent No.: US 9,254,779 B2
(45) Date of Patent: Feb. 9, 2016

(54) LARGE HEAVY DUTY RATCHET

(71) Applicant: Kenneth G. Kingery, Mesa, AZ (US)

(72) Inventor: Kenneth G. Kingery, Mesa, AZ (US)

(*) Notice: Subject to any disclaimer, the term of this patent is extended or adjusted under 35 U.S.C. 154(b) by 0 days.

(21) Appl. No.: 13/935,241

(22) Filed: Jul. 3, 2013

(65) Prior Publication Data

US 2014/0008480 A1 Jan. 9, 2014

Related U.S. Application Data

(60) Provisional application No. 61/667,580, filed on Jul. 3, 2012.

(51) Int. Cl.
*B21F 9/00* (2006.01)
*B66F 3/00* (2006.01)
*B60P 7/08* (2006.01)

(52) U.S. Cl.
CPC ........................................ *B60P 7/083* (2013.01)

(58) Field of Classification Search
USPC ......... 254/214, 215, 218, 221, 223, 224, 225, 254/238, 239, 243, 261, 371
See application file for complete search history.

(56) References Cited

U.S. PATENT DOCUMENTS

| | | | | |
|---|---|---|---|---|
| 2,506,029 A * | 5/1950 | Maasdam | ...................... | 254/369 |
| 2,889,136 A * | 6/1959 | Prete, Jr. | ...................... | 254/218 |
| 3,302,932 A * | 2/1967 | Wallin | ........................... | 254/390 |
| 4,227,286 A * | 10/1980 | Holmberg | ................... | 24/68 CD |
| 4,523,744 A * | 6/1985 | Bonassi | ........................ | 254/371 |
| 4,580,766 A * | 4/1986 | Woodgate | ..................... | 254/371 |
| 5,203,541 A * | 4/1993 | Nix | ................ | 254/218 |
| D362,614 S | 9/1995 | Kingery | | |
| 6,068,242 A | 5/2000 | Kingery | | |
| 6,092,791 A * | 7/2000 | Kingery | ........................ | 254/371 |
| D434,295 S * | 11/2000 | Liang | ............................. | D8/44 |
| 6,648,301 B2 * | 11/2003 | Lee | ................ | 254/218 |
| 7,464,915 B2 * | 12/2008 | Liu et al. | ....................... | 254/217 |
| 7,584,940 B2 * | 9/2009 | Gee | ................ | 254/238 |
| 7,651,072 B1 * | 1/2010 | Chang | .......................... | 254/218 |
| 8,286,945 B2 * | 10/2012 | Polin et al. | .................... | 254/239 |
| 2001/0045548 A1 * | 11/2001 | Landy | ........................... | 254/217 |
| 2003/0146424 A1 * | 8/2003 | Lee | ................ | 254/237 |
| 2009/0283729 A1 * | 11/2009 | Carlson et al. | ................ | 254/218 |

* cited by examiner

*Primary Examiner* — Emmanuel M Marcelo
(74) *Attorney, Agent, or Firm* — The von Hellens Law Firm, Ltd.

(57) ABSTRACT

The frame of a large heavy duty ratchet supports a spool about an axis of rotation. A handle, pivotable about the axis of rotation, includes protrusions engageable with toothed wheels on opposed sides of the spool to urge incremental rotation of the spool upon repetitive pivotal movement of the handle. A pair of spring-loaded pawls engage the toothed wheels to limit the direction of rotation of the toothed wheels. A cam, formed as part of the handle, disengages the pair of pawls from the toothed wheels upon pivotal movement of the handle to a certain extent to permit rotation of the spool in either direction.

7 Claims, 6 Drawing Sheets

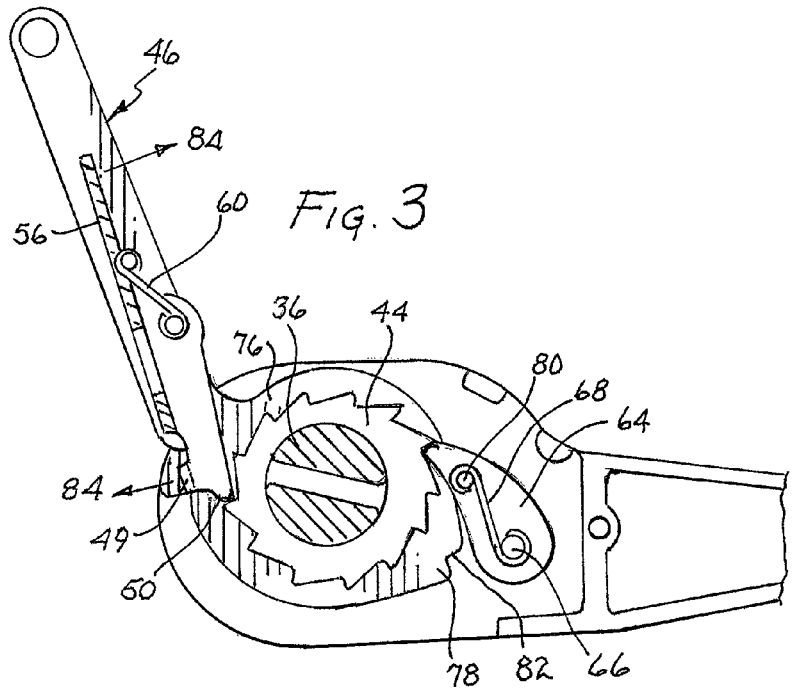
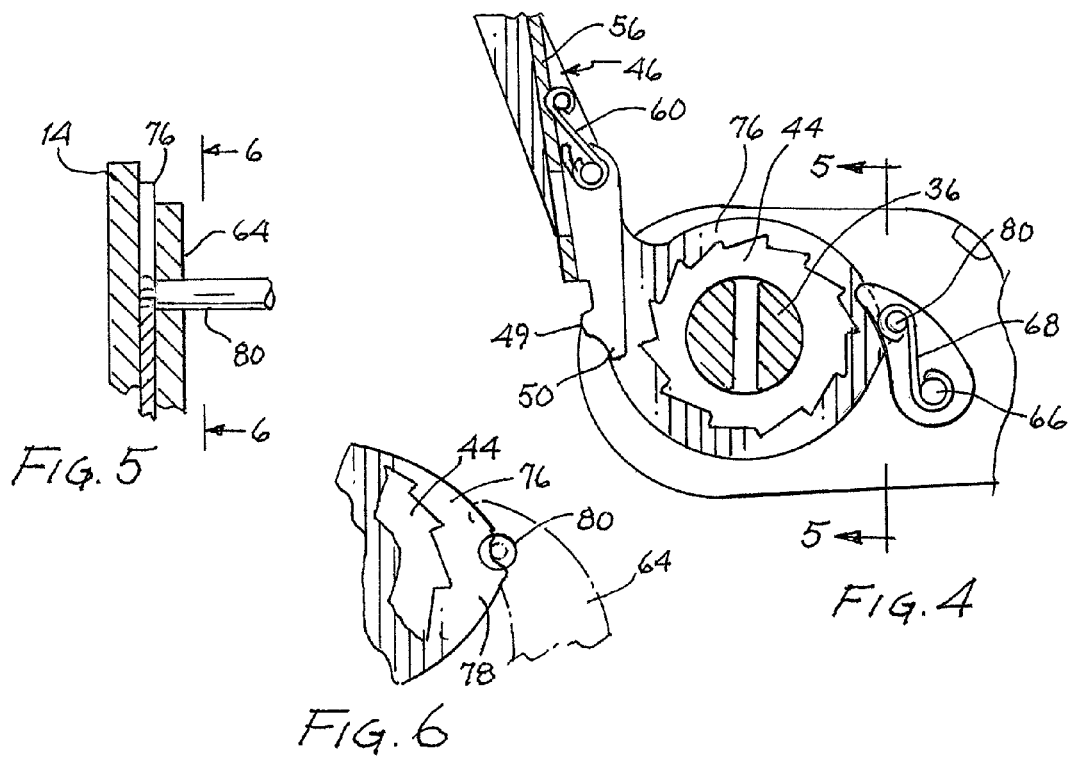

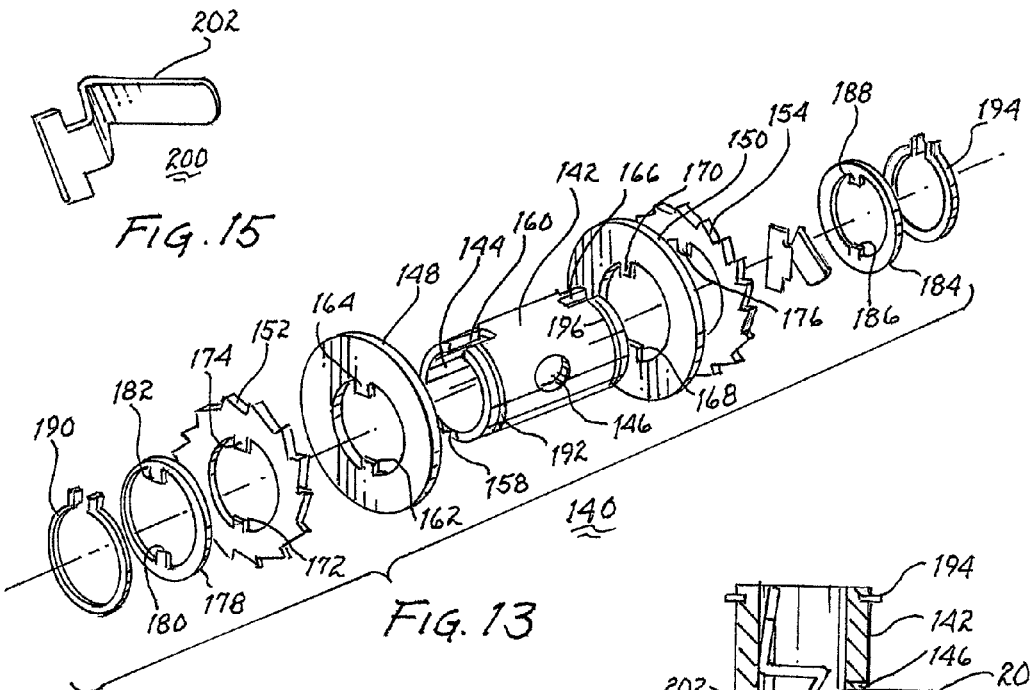
FIG. 15
FIG. 13
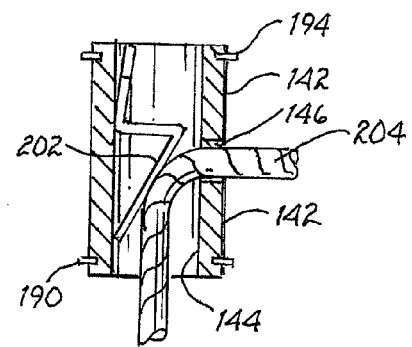
FIG. 14
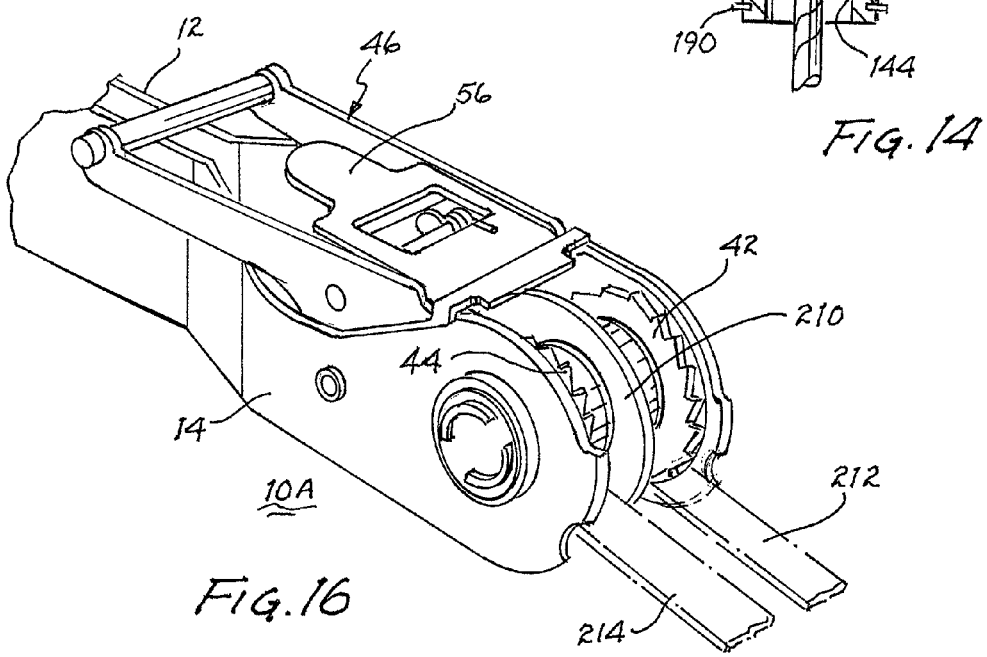
FIG. 16

LARGE HEAVY DUTY RATCHET

CROSS REFERENCE TO RELATED APPLICATIONS

The present application claims priority to a provisional patent application entitled "HEAVY DUTY RATCHET", assigned Ser. No. 61/667,580 and filed Jul. 3, 2012, which describes an invention made by the present inventor.

BACKGROUND OF THE INVENTION

1. Field of the Invention

The present invention relates to ratchets and, more particularly, to multiple purpose large heavy duty ratchets.

2. Description of Related Prior Art

Ratchets for applying tension to a cord have been in use for many years and numerous patents have issued directed thereto. U.S. Pat. Nos. 6,068,242, 6,092,791, and Des. 362,614 are representative and are incorporated herein by reference. These ratchets generally include a pair of discs supporting an ingoing and outgoing cord. Upon exerting a pulling force on the outgoing cord, tension is applied to the ingoing cord. To prevent slippage of the cord extending about the pair of discs, there are ridges on the pair of discs in frictional engagement with the cord. Reverse rotation of the pair of discs is generally precluded by use of a pawl engaging a toothed wheel or gear. Upon manual release of the pawl, the pair of discs are free to rotate in either direction. Usually, a hook extends from the body of the ratchet for engagement with an anchor or the like.

Ratchets used to apply tension to webbing have also been available for many years. These ratchets include a spool having a slot formed therein to receive the end of a length of webbing. A pivotally mounted handle includes a spring-loaded slide for engagement with sprockets disposed on either side of the spool. Upon rotation of the handle, the spool rotates and webbing becomes drawn about the spool. Movement of the spool in the opposite direction to release tension on webbing is restricted by a further slide engaging the sprockets. Upon manual engagement of the further slide to withdraw it from engagement with the sprockets, the spool is free to rotate to permit unwinding of the webbing.

Either type of ratchet described above is useable to apply loads usually not in excess of 100 pounds. Moreover, the mechanism of release of the spool requires a certain degree of manual dexterity and strength as a function of the load imposed on the cord or webbing. Thus, these ratchets have limited use with respect to the tension load capability. Furthermore, a significant degree of manual strength may be required to release the spool to permit unwinding of the cord or webbing.

SUMMARY OF THE INVENTION

The present invention is directed to ratchet mechanisms capable of providing tension loads to a rope, strap or webbing in excess of 40,000 pounds. Loads of this magnitude require not only robust construction but also mechanisms easily manually useable. A two-sided frame is joined at one end to support a hook for engagement with either an anchor or the load. The open end of the frame rotatably supports a spool about an axis of rotation. Toothed wheels on either side of the spool are mechanically locked with the spool. A handle is pivotable about the axis of rotation of the spool and includes a pivotable member for engaging the teeth of the toothed wheels to cause rotation in one direction of the toothed wheels and the spool as the handle is pivoted about the axis of rotation. A pair of spring-loaded pawls engage respective toothed wheels to prevent rotation in the other direction. Upon rotation of the handle in the one direction a certain distance, a cam engages a bar extending between the pawls to disengage the pawls from the toothed wheels. Thereafter, the spool is free to rotate in either direction and the cord or webbing may be unwound from about the spool. The end of the cord or webbing may include a hook or other device for attachment to either an anchor or the load.

It is therefore a primary object of the present invention to provide a ratchet capable of handling a load of tens of thousands of pounds.

Another object of the present invention is to provide a large scale ratchet having an operating handle capable of grasping by a user's hand.

Yet another object of the present invention is to provide a ratchet having a cam useable to release an applied load.

Still another object of the present invention is to provide a ratchet having interchangeable spools for engaging a rope, a strap, webbing or dual webbings.

A further object of the present invention is to provide a ratchet with a hollow spool having an axially oriented passageway in engagement with a laterally oriented passageway to accommodate insertion of the end of a rope through the lateral passageway and drawing it out through the axial passageway.

A yet further object of the present invention is to provide a manually operable ratchet capable of exerting a load on a rope or webbing extending therefrom on the order of tens of thousands of pounds.

A still further object of the present invention is to provide a method for using a ratchet to apply a load of tens of thousands of pounds.

A still further object of the present invention is to provide a method for using a ratchet with any of several different types of spools.

These and other objects of the present invention will become apparent to those skilled in the art as the description thereof proceeds.

BRIEF DESCRIPTION OF THE DRAWINGS

The present invention will be described with greater specificity and clarity with reference to the following drawings, in which:

FIG. 3 is a partial cutaway view showing movement of the handle;

FIG. 4 is a partial cutaway view illustrating disengagement between the handle and the spool supported toothed wheel and between the spool supported wheel and the pawl;

FIG. 5 is a partial cross-sectional view taken along lines 5-5 as shown in FIG. 4;

FIG. 6 is a partial side view taken along lines 6-6 as shown in FIG. 5;

FIG. 13 is an exploded view of the second variant spool;

FIG. 14 illustrates the engagement of a cord with the second variant spool;

FIG. 15 illustrates a ramp useable with the second variant spool, as shown in FIG. 14; and FIG. 16 illustrates a variant of the spool shown in FIGS. 1 and 2.

DESCRIPTION OF THE PREFERRED EMBODIMENT

Figure 1:
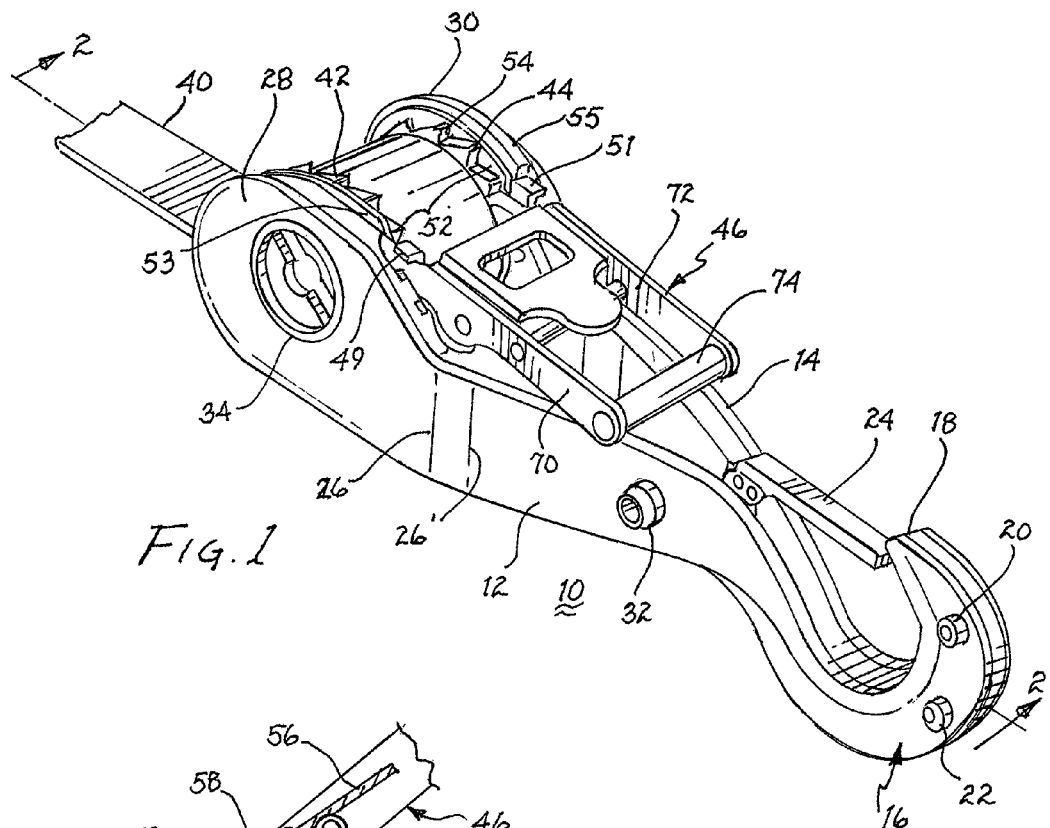
FIG. 1 is an isometric view of a large heavy duty ratchet.

Referring to FIG. 1, there is shown a ratchet 10 particularly adapted to handle loads in excess of 40,000 pounds. To handle such loads, the components of the ratchet are made of high strength materials and are preferably composite or metallic. The ratchet includes a pair of frames 12, 14 defining a hook 16 at one end. As illustrated, an insert 18 is disposed between the ends of frames 12, 14 defining hook 16. These three elements may be joined with one another by nut and bolt sets 20, 22. A spring-loaded keeper 24 may be used to prevent inadvertent disengagement of hook 16 from whatever element to which the hook is attached. It is to be understood that the hook may be engaged with an anchor or with an item or load to be drawn toward the anchor. In either event, the operation of ratchet 10 would not be changed. Frames 12 and 14 are bent at approximate the locations corresponding with lines 26, 26' to locate ends 28, 30 spaced apart and parallel with one another. Toward the hook end, frames 12, 14 converge toward one another and are essentially parallel with one another in the area defined by hook 16. A nut and bolt set 32 draws the frames toward one another to prevent splaying or distortion.

Figure 2:
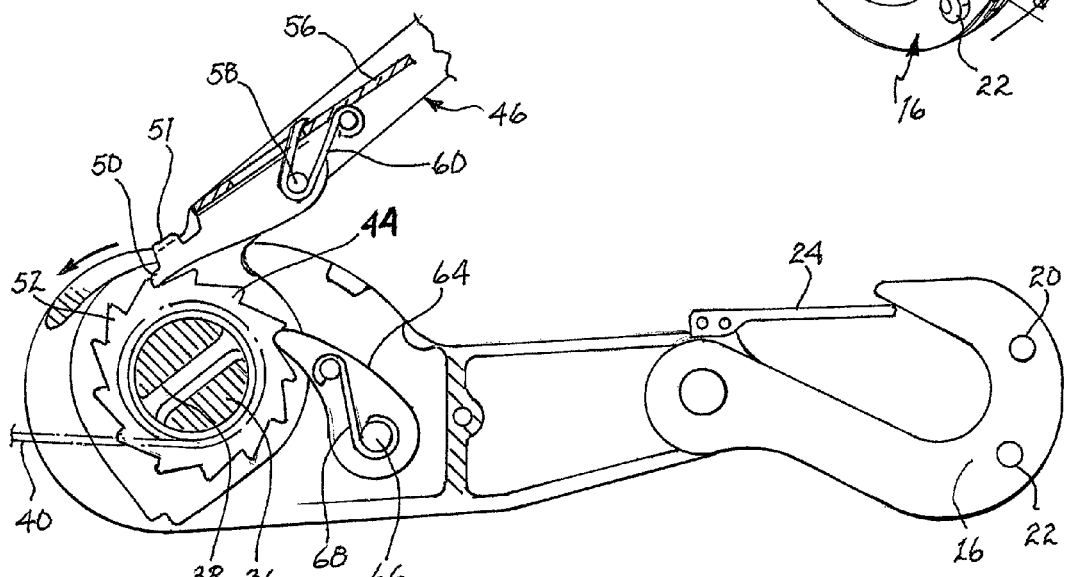
FIG. 2 is a cutaway view taken along lines 2-2 as shown in FIG. 1.

Referring jointly to FIGS. 1 and 2, certain features will be described. Frame end 28, 30 include circular apertures, of which aperture 34 in frame end 28 is illustrated. A spool 36 is rotatably supported within these apertures to accommodate rotational movement of the spool relative to frames 12, 14. The spool is essentially cylindrical and includes a slot 38 extending through the midpoint. The purpose of the slot is to capture the end of a strap or webbing by drawing an end of the strap or webbing through the slot and thereafter capturing the end by further webbing wrapped around the spool.

A pair of toothed wheels 42, 44 are secured to spool 36 to prevent independent rotation therebetween. A handle 46 pivots about the axis of rotation of spool 36. It includes a pair of protrusions 48, 50 for engagement with corresponding teeth 52, 54 of toothed wheels 42, 44, respectively. Upon pivotal movement of handle 46, as particularly shown in FIG. 2, the toothed wheels and attached spool 36 are caused to rotate in the counterclockwise direction, as illustrated in FIG. 2. Protrusions 48, 50 extend from a pivotable lever 56 pivotal about shaft 58 and spring-loaded by spring 60. Guides 49, 51 ride along the underside of overhangs 53, 55 to urge engagement of the protrusions with the teeth of the toothed wheels. A pair of pawls 62, 64, of which pawl 64 is shown in FIG. 2, engage the teeth of respective toothed wheels 42, 44 to preclude clockwise movement of the toothed wheels and the attached spool. A shaft 66 pivotally supports the pair of pawls. A spring 68 biases the pawls in the counterclockwise direction to engage the toothed wheels and prevent their rotation and that of the spool in the clockwise direction. Yet, the spring permits pivotal movement of the pawls clockwise as the teeth of the toothed wheels rotate counterclockwise therepast.

Referring jointly to FIGS. 3, 4, 5 and 6, further operation of handle 46 will be described. Handle 46 includes two spaced apart planar fixtures 70, 72 (see also FIG. 9) joined at one end by a bar 74. The other end of each fixture includes an element 76 centrally apertured for receiving spool 36 rotatably mounted therein. The configuration of each element 76 includes a cam 78 to bear against shaft 80 interconnecting pawls 62, 64 as handle 46 is rotated in the counterclockwise direction shown in FIGS. 3 and 4. Because of the radial extension of the cam, it will tend to urge shaft 80 in a clockwise direction about shaft 66. This movement is resisted by spring 68. The cam may include an indentation 82 to capture shaft 80. Upon engagement of cam 78 with shaft 80, pawls 62, 64 will become disengaged from the respective toothed wheels, of which wheel 44 is shown in FIGS. 3 and 4. Additionally, the end of lever 56 is depressed against the force of spring 60 to result in movement of the lever in the direction indicated by arrows 84 shown in FIG. 4. The resulting pivotal movement of lever 56 will cause disengagement of its protrusions (of which protrusion 50 is shown). Thereby, protrusions 48, 50 become disengaged from the respective toothed wheels. Now, spool 36 is free to rotate in either direction. Thereby, the attached webbing may be drawn away from and disengaged with spool 36 as the spool can rotate to permit unwinding of the webbing thereabout.

Referring briefly to FIGS. 5 and 6, further details attendant the use of cam 78 to disengage pawls 62, 64 from the toothed wheels will be described. Shaft 80 extends to the outside of each of pawls 62, 64, as shown in FIG. 6. Indentation 82 of cam 78 receives shaft 80 and because of the indentation will retain the shaft therewithin until handle 46 is rotated clockwise (see FIGS. 3 and 4).

Figure 7:
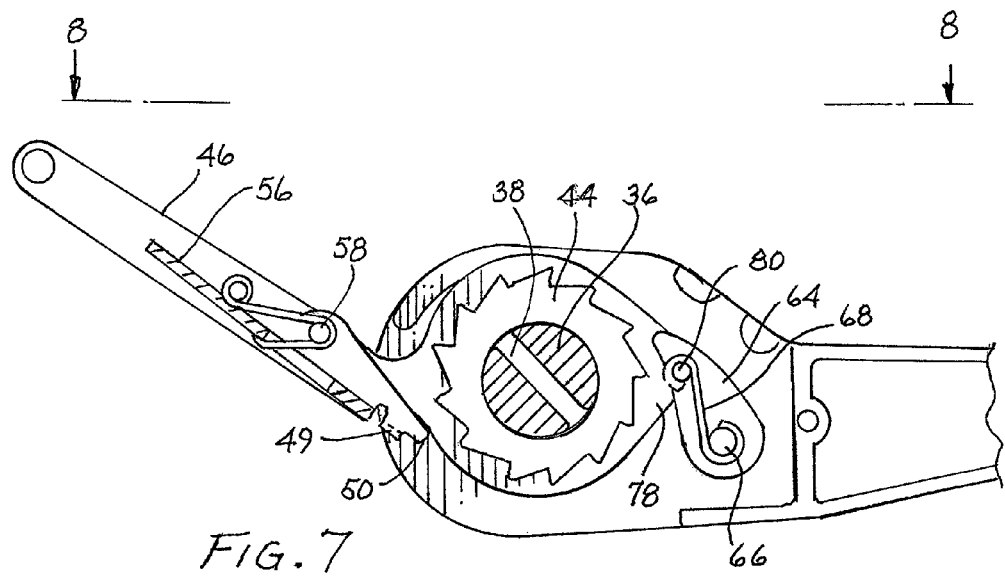
FIG. 7 is a partial cutaway view illustrating disengagement of the pawls from the toothed wheels attendant the spool.
Figure 8:
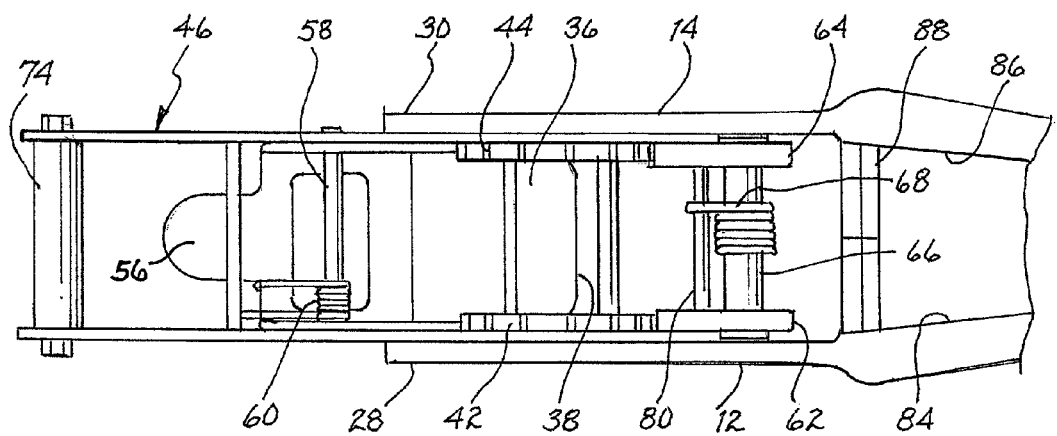
FIG. 8 is a top view taken along lines 8-8 as shown in FIG. 7.

Referring jointly to FIGS. 7 and 8, the functional and physical relationships of the various elements will be described. The cutaway view of the ratchet shown in FIG. 7 illustrates the ratchet in the configuration to permit free rotation of spool 36 in either direction. It also illustrates the end of pivotal movement of handle 46 wherein indentation 82 of cam 78 is in engagement with shaft 80 to rotate pawl 64 away from toothed wheel 44. Protrusion 50 of lever 56 would normally be in engagement with one of the teeth of toothed wheel 44, as shown in FIG. 4. However, for illustrative purposes the lever is shown in its quiescent position. The top view shown in FIG. 8 illustrates ends 28, 30 of frames 12, 14 being essentially parallel with one another. As shown in FIG. 8, the tapering section of frames 12, 14 may include ledges 84, 86 to lend further robustness to the ratchet.

Figure 9:
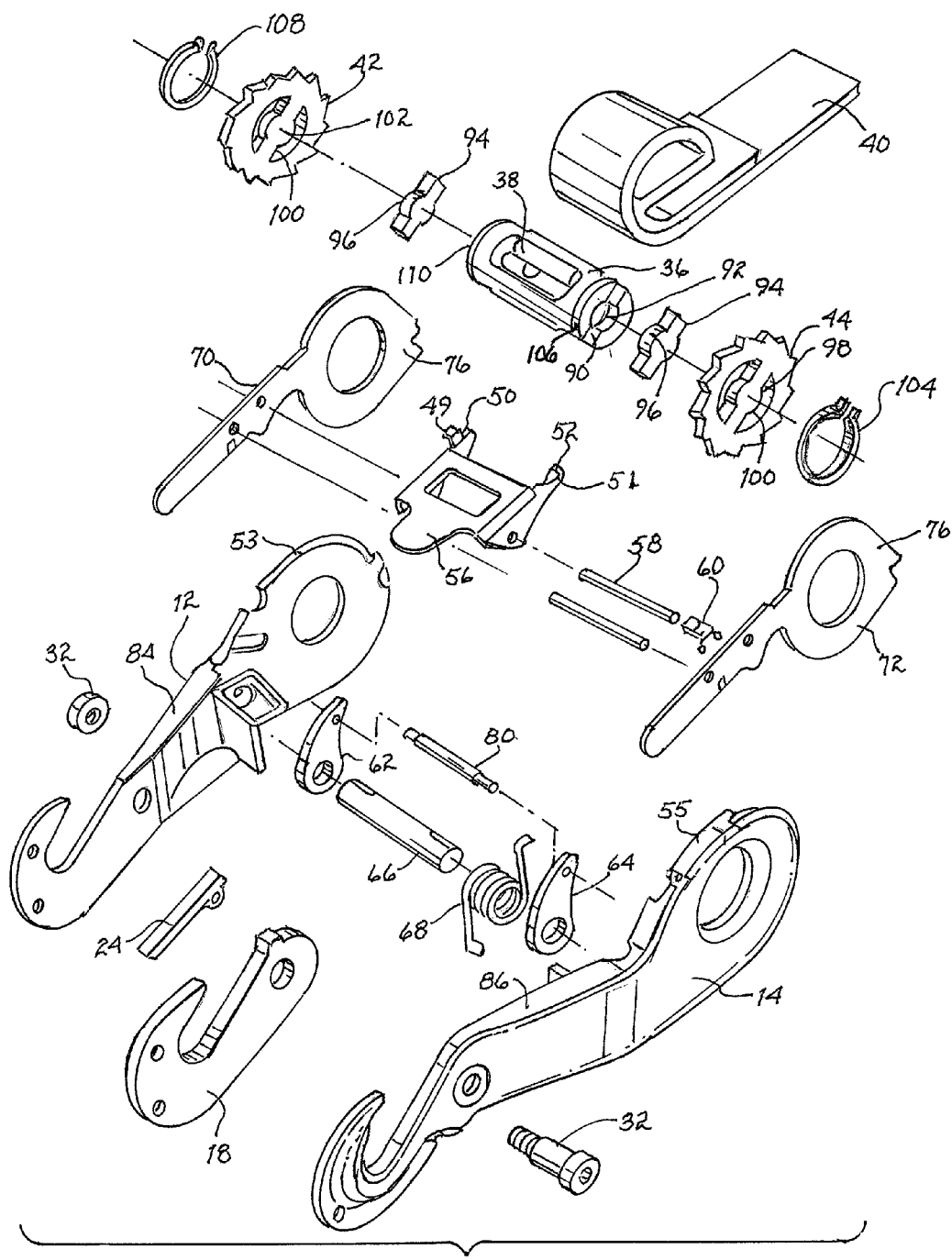
FIG. 9 is an exploded view showing parts of the ratchet.

FIG. 9 is an exploded view illustrating the primary elements of ratchet 10 and their relative locations. By inspection, it becomes apparent how these elements interact and cooperate with one another. As shown, spool 36 includes diametric slots at opposed ends of which slot 90 is shown. Each of these slots includes a central expanded keyway 92. An insert 94 is placed within the slot 90 and includes a key 96 cooperating with keyway 92. Toothed wheel 44 includes a central bar 98 for placement within slot 90 of the spool and a key 100 for engaging keyway 92. Thereby, toothed wheel 94 is in locking engagement with spool 36. A further insert 94 is disposed within a slot on the other end of spool 36, which is similar to slot 90. It also includes a keyway similar to keyway 92 for receiving key 96. Toothed wheel 42 includes a central bar 100 for engagement with the spool 36 and a key 102 for engaging the keyway in the slot. A snap ring 104 engages a groove 106 in spool 36, which groove is external of fixture 72. A further snap ring 108 engages a groove 110 in the other end of spool 36, which groove is exterior of fixture 70. Thereby, the toothed wheels are in non-rotatable engagement with the spool and the spool is captured intermediate fixtures 70, 72.

Figure 10:
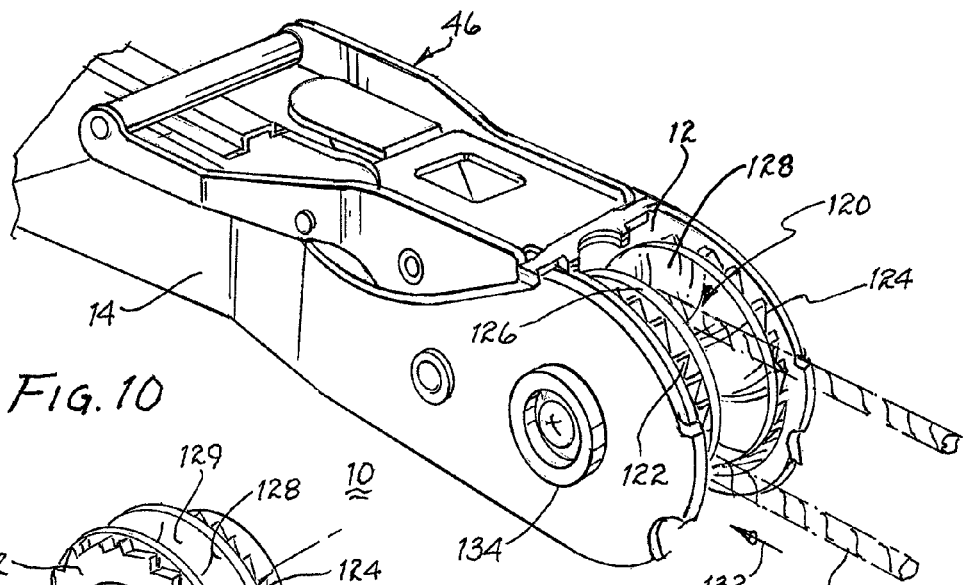
FIG. 10 is an isometric view of the ratchet embodying a first variant spool.
Figure 11:
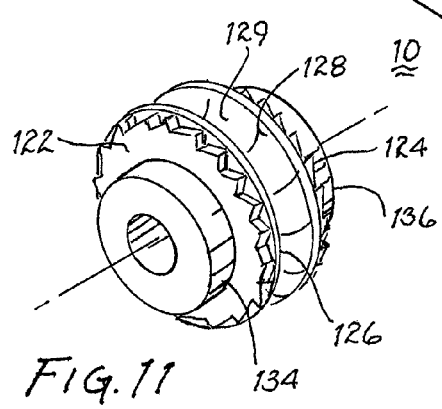
FIG. 11 is an isometric view of the first variant spool.
Figure 12:
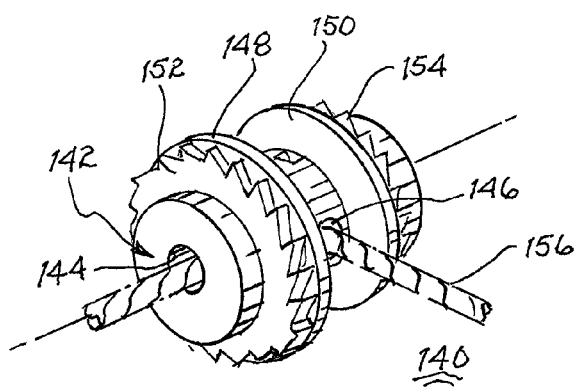
FIG. 12 is an isometric view of a second variant spool.

Referring jointly to FIGS. 10 and 11, there is shown a further embodiment of the present invention. In particular, a ratchet 10 is shown with a first variant spool 120. This spool includes laterally disposed toothed wheels 120, 124, as described above. Spool 120 includes a pair of discs 126, 128. These discs are mechanically joined with one another to preclude independent rotation therebetween. Each of these discs includes non-radial ridges 129 with the ridges of one disc being interleaved with the ridges of the other disc. Further details of these discs are set forth in U.S. Pat. Nos. 6,068,242, 6,092,791, and Des. 362,614, recited above and incorporated herein by reference. The function and purpose of the discs and the ridges disposed thereon is that of gripping a cord 130 under tension. That is, as handle 46 is repeatedly pivoted, spool 120 is caused to rotate. Such rotation, gripping cord 130, will draw the cord into and about spool 120. The direction of travel of cord 130 is represented by arrow 132. Spool 120 includes opposed bosses 134, 136 journalled in frames 12, 14.

Referring jointly to FIGS. 12, 13, 14 and 15, a second variant spool useable with ratchet 10 will be described. As particularly shown in FIG. 12, spool 140 is formed by a cylinder 142. The cylinder includes a central passageway 144 extending therethrough. A lateral passageway 146 interconnects with the central passageway. Discs 148, 150 are mounted on the spool in fixed relationship with respect to one another to provide a space therebetween and to expose a certain width of the cylindrical surface of the spool. Laterally of disc 148 is a toothed wheel 152 of the type described above. Similarly, a further toothed wheel 154 is disposed adjacent disc 150 and of the type described above. A cord 156 may be inserted into lateral passageway 146 to exit through central passageway 144. In operation, as spool 140 is rotated in the clockwise direction based on the illustration in FIG. 12, cord 156 will become wrapped about the spool between discs 148, 150. The tension force exerted upon the cord will exert pressure upon underlying wrappings of the cord to preclude slippage.

Referring more particularly to FIGS. 13, 14 and 15, further details attendant spool 140 will be described. One end of cylinder 142 includes slots 158, 160 for engagement with nubs 162, 164 of disc 148. Thereby, the slots control the interior location of disc 148 and prevent rotation of the disc relative to the cylinder. The other end of the cylinder includes similar slots, of which slot 166 is illustrated. Disc 150 includes nubs 168, 170 for engagement with respective slots in the cylinder. Again, these slots control the position of the disc relative to the cylinder and preclude rotation of the disc independent of the cylinder. Toothed wheel 152 includes nubs 172, 174 for engagement with slots 158, 160 to preclude independent rotation between the toothed wheel and the cylinder. Similarly, toothed wheel 154 includes nubs for engagement with the corresponding slots in the cylinder and of which nub 176 is shown. A spacer ring 178 is mounted on cylinder 142 exterior of toothed wheel 152. It may also include nubs 180, 182 which nubs engage slots 158, 160. A similar spacer ring 184 includes nubs 186, 188 for engagement with the corresponding slots in cylinder 142. A snap ring engages the corresponding groove 192 in cylinder 142 to retain the ring, toothed wheel and spacer ring in place. A similar snap ring 194 is engageable with groove 196 in cylinder 142 to retain the disc, toothed wheel and the spacer ring in place.

To assist in introducing a cord or rope through lateral passageway 146 into central passageway 144, a ramp 200 shown in FIG. 15 may be employed. As demonstrated in FIG. 14, the ramp is inserted within central passageway 144 to locate incline 202 generally coincident with lateral passageway 146. Thereby, as cord 204 is fed through the lateral passageway, contact with incline 202 will urge bending of the cord into central passageway 144 and it will exit the cylinder.

Ratchet 10A shown in FIG. 16 is essentially duplicative of ratchet 10 shown in FIG. 1 and its related figures. The main difference is that a ring 210 is mounted on the spool to segregate the spool into two sections. A first strap or webbing 212 wraps about the spool between toothed wheel 42 and ring 210. A further strap or webbing 214 wraps about the spool intermediate toothed wheel 44 and ring 210. Thereby, two straps may be simultaneously wound about the spool of ratchet 10A.

I claim:

1. A heavy duty ratchet comprising:
   (a) a pair of frames joined at one end and spaced apart at a second end;
   (b) a spool rotatably mounted intermediate said pair of frames at the second end, said spool including a surface, a longitudinal passageway and a lateral passageway extending from said surface of said spool to said longitudinal passageway to accommodate drawing a cord through said lateral passageway into said longitudinal passageway and out of said spool, including a ramp disposed within said longitudinal passageway to guide the cord between said lateral passageway and said longitudinal passageway;
   (c) a pair of toothed wheels mounted in spaced apart relationship upon and in locking relationship with said spool;
   (d) a handle pivotally mounted between said pair of frames, said handle including a pair of protrusions for engaging the teeth of a respective one of said pair of toothed wheels to urge rotation of said spool in one direction upon pivotal movement of said handle in the one direction;
   (e) a pair of spring-loaded pawls pivotally mounted intermediate said pair of frames for engaging a respective one of said pair of toothed wheels to prevent rotation of said spool in the other direction;
   (f) said handle including a cam for disengaging said pair of pawls from said pair of toothed wheels upon pivotal movement of said handle to a certain extent in the one direction; and
   (g) a spring-loaded lever for disengaging said protrusions from said toothed wheels to permit pivotal movement of said handle without corresponding rotation of said spool.

2. The heavy duty ratchet as set forth in claim 1 wherein said pair of pawls include a spring for biasing said pair of pawls into engagement with said toothed wheels, a rod interconnecting said pair of pawls for engagement by said cam to urge disengagement of said pair of pawls from said pair of toothed wheels.

3. The heavy duty ratchet as set forth in claim 1 including a hook disposed at the one end of said heavy duty ratchet and defined by said frames.

4. A heavy duty ratchet comprising:
   (a) a body having a pair of spaced apart frames joined at one end;
   (b) a spool rotatably mounted between said pair of frames, said spool including a central passageway and a lateral passageway extending from the surface of said spool to said central passageway to accommodate drawing a cord through said lateral passageway into said central passageway and out the side of said spool and a ramp disposed within said central passageway to guide the cord between said lateral passageway and said central passageway;

(c) a pair of toothed wheels non-rotatably mounted on said spool in spaced apart relationship and intermediate said pair of frames;
(d) a handle pivotally mounted on said body, said handle including protrusions for engaging and incrementally rotating said pair of toothed wheels in a first direction upon pivotal movement of said handle;
(e) a pair of spring-loaded pawls in engagement with said toothed wheels for preventing rotation of said pair of toothed wheels in a second direction;
(f) a cam secured to said handle for disengaging said pair of pawls from said pair of toothed wheels upon pivotal movement of said handle in the first direction; and
(g) a pivotable lever mounted on said handle for disengaging said protrusions from said pair of toothed wheels to accommodate independent pivotal movement of said handle in either direction.

5. The heavy duty ratchet as set forth in claim 4 including a hook disposed at the one end of said heavy duty ratchet and defined by said frames.

6. A method for tying down and releasing an item of interest with a heavy duty ratchet, said method comprising the steps of:
(a) attaching the ratchet to an anchor;
(b) securing the ratchet to the item of interest;
(c) pivoting a handle of the ratchet to draw the item of interest toward the anchor with a flexible element, said step of pivoting including the step of engaging two protrusions extending from the handle with two toothed wheels secured to a spool to cause rotational movement of the spool in one direction upon pivotal movement of the handle;
(d) the spool including a central passageway extending therethrough and a lateral passageway extending into the central passageway and including the step of inserting a cord through the lateral passageway and drawing it partially out through the central passageway;
(e) further engaging a pair of pawls with the two toothed wheels to prevent rotational movement of the spool in the other direction; and
(f) disengaging the pair of pawls from the two toothed wheels upon a degree of rotational movement of the handle in the one direction to accommodate rotation of the spool in the other direction, release of tension upon the flexible element and permit disengagement of the heavy duty ratchet from the anchor and from the item of interest.

7. A tensioning device for use with webbing or a cord, said device comprising:
(a) a pair of spaced apart frames;
(b) a spool rotatably mounted in said pair of frames for supporting webbing wrapped thereabout;
(c) said spool being hollow and defining apertures at opposed ends and including a circumferential surface and an opening in said circumferential surface for accommodating passage of a cord through said opening into said spool and out through one of said apertures;
(d) a first toothed wheel mounted on said spool adjacent one frame of said pair of frames and a second toothed wheel mounted on said spool adjacent the other frame of said pair of frames;
(e) a pair of fixtures having free ends, each handle of said pair of fixtures being rotatably mounted in one frame of said pair of frames and a grip interconnecting said free ends of said pair of fixtures;
(f) first and second protrusions pivotally mounted on said device for engaging and rotating in one direction said first and second toothed wheels, respectively, upon pivotal movement of said pair of fixtures;
(g) a pair of spring-loaded pawls mounted upon said pair of frames for preventing rotation of said spool in the other direction; and
(h) a cam formed as part of said fixtures for disengaging said pair of pawls from said spool.

\* \* \* \* \*